(12) United States Patent
Cheng

(10) Patent No.: US 8,910,892 B2
(45) Date of Patent: Dec. 16, 2014

(54) WASTE TIRE SEPARATION RECYCLING TREATMENT DEVICE

(71) Applicant: Li-Feng Cheng, Taipei (TW)

(72) Inventor: Li-Feng Cheng, Taipei (TW)

(73) Assignee: E-Sunscience Co., Ltd., Taipei (TW)

( * ) Notice: Subject to any disclaimer, the term of this patent is extended or adjusted under 35 U.S.C. 154(b) by 152 days.

(21) Appl. No.: 13/735,037

(22) Filed: Jan. 7, 2013

(65) Prior Publication Data

US 2014/0191068 A1 Jul. 10, 2014

(51) Int. Cl.
| | |
|---|---|
| *B02C 19/00* | (2006.01) |
| *B02C 23/14* | (2006.01) |
| *B02C 23/10* | (2006.01) |
| *B02C 4/02* | (2006.01) |
| *B29B 17/02* | (2006.01) |
| *B29L 30/00* | (2006.01) |
| *B29B 17/04* | (2006.01) |

(52) U.S. Cl.
CPC ................. *B02C 23/14* (2013.01); *B02C 23/10* (2013.01); *B02C 4/02* (2013.01); *B29B 17/02* (2013.01); *B02C 2201/04* (2013.01); *B29L 2030/00* (2013.01); *B29B 2017/0217* (2013.01); *B29B 2017/0496* (2013.01); *Y10S 241/31* (2013.01)
USPC .................... 241/79.1; 241/100; 241/DIG. 31

(58) Field of Classification Search
CPC .................................................... B02C 2201/04
USPC ........... 241/100, 79.1, 152.2, DIG. 31, 24.14, 241/24.15, 24.17
See application file for complete search history.

(56) References Cited

U.S. PATENT DOCUMENTS

| | | | | |
|---|---|---|---|---|
| 2,786,636 | A * | 3/1957 | Oishi | 241/79.1 |
| 3,923,256 | A * | 12/1975 | Dorner | 241/76 |
| 4,098,464 | A * | 7/1978 | Niedner et al. | 241/19 |
| 4,684,071 | A * | 8/1987 | Dicky | 241/80 |
| 5,562,255 | A * | 10/1996 | Witko et al. | 241/158 |
| 5,634,599 | A * | 6/1997 | Khais et al. | 241/23 |
| 5,927,627 | A * | 7/1999 | Edson et al. | 241/159 |
| 6,439,486 | B1 * | 8/2002 | Nitta et al. | 241/29 |
| 7,032,847 | B1 * | 4/2006 | Debailleul | 241/1 |

* cited by examiner

*Primary Examiner* — Mark Rosenbaum
(74) *Attorney, Agent, or Firm* — Leong C. Lei

(57) ABSTRACT

A waste tire separation recycling treatment device includes a machine rack, a pair of crushing rollers, a pair of stripping wheels and a guiding portion. After a waste tire, which is performed with pyrolysis, is placed in the device to obtain a non-metal scrap, a metal scrap and a mixture, and above 98% of the non-metal scrap, the metal scrap and the mixture are sequentially rolled and striped off to transform them into the non-metal scrap and the metal scrap. Afterward, several separation processes are performed to separate the non-metal scrap and the metal scrap, thereby greatly increasing the efficiency of separation recycling treatment.

9 Claims, 3 Drawing Sheets

WASTE TIRE SEPARATION RECYCLING TREATMENT DEVICE

BACKGROUND OF THE INVENTION

1. Field of the Invention

The present invention generally relates to a technical field of a scrap separation and recycling device, in particular to a treatment device capable of rolling, stripping off and guiding scrap of waste tires performed with pyrolysis to achieve the separation and recycling.

2. Description of the Related Art

According to different kinds of industrial products made of continuously advanced technologies, it does not only bring much convenience for people but also increases life quality greatly. Relatively, various industrial wastes are also produced accordingly. These kinds of industrial wastes are produced by toxic petrochemical raw materials. Burying these wastes is unable to perform biodegradation, and moreover its toxicity may pollute soil and water resources. If these wastes are burned, exhaust generated from burning must be neutralized and filtered by a washing tower or other air pollution treatment equipment so as to neutralize exhaust. For example, compounds, such as dioxin, must be removed to exhaust gas that may not harm human bodies.

Currently, the treatment equipment for different kinds of industrial wastes includes a normal incinerator, a melting furnace, a dry distillation pyrolysis furnace, etc., wherein the combustion temperature of the incinerator is about 800 to 900 degree Celsius to burn the industrial wastes into fly ash state. The combustion temperature of the melting furnace is about 1500 degrees Celsius to burn fly ash into melting state. The dry distillation pyrolysis furnace can heat to reach about 400 to 1000 degrees Celsius and perform dry distillation at the same time to pyrolyze the industrial wastes of waste tires or the plastic materials into a non-metal scrap as oil vapor and coke, or a metal scrap as steel wires provided for recycling and reutilization.

However, the non-metal scrap and the metal scrap are non-uniformly mixed and must be manually separated and screened. A mixture of the foregoing both scraps is further produced after pyrolysis. The mixture is that the non-metal scrap is covered on a surface of the metal scrap and must be stripped off to separate both by utilizing labor forces. It does not only have time consuming and take so much effort to cause worse efficiency but also increases the production costs.

SUMMARY OF THE INVENTION

Therefore, it is a primary objective of the present invention to provide a waste tire separation recycling treatment device that is designed for products after pyrolysis and capable of full-automatically separating and recycling the non-metal scrap and the metal scrap, thereby greatly improving the efficiency and quality during separation and recycling.

To achieve the foregoing objective, the present invention provides a waste tire separation recycling treatment device, wherein a waste tire is composed of a rubber material and a metal material and formed into a non-metal scrap, a metal scrap and a mixture after pyrolysis, and the mixture is that the non-metal scrap is covered on a surface of the metal scrap, the waste tire separation recycling treatment device comprising: a machine rack disposed with a feeding port for placing the non-metal scrap, the metal scrap and the mixture; a set of crushing rollers disposed in the machine rack and located at a side of the feeding port, a first spacing T1 disposed between the set of crushing rollers, the first spacing T1 being smaller or equal to sizes of the non-metal scrap, the metal scrap and the mixture to roll the non-metal scrap, the metal scrap and the mixture such that the non-metal scrap, the metal scrap and the non-metal scrap on a surface of the mixture are crushed; a set of first stripping wheels disposed in the machine rack and located at a side of the set of crushing rollers, a second spacing T2 dispose between the set of stripping wheels, the second spacing T2 being greater than the first spacing T1, the set of first stripping wheels stripping off the metal scrap on the surface of the mixture having a great volume and the non-metal scrap to separate the mixture having the great volume into the metal scrap and the non-metal scrap; and a guiding portion disposed in the machine rack and located at a side of the set of first stripping wheels to guide the non-metal scrap, the mixture having a small volume and the metal scrap and to separate the non-metal scrap having the small volume and the mixture from the metal scrap.

The set of crushing rollers is symmetrically disposed. The set of stripping wheels is symmetrically disposed, and a surface of each stripping wheel is respectively disposed with a plurality of paw portions, and the paw portions are interlaced, and the second spacing T2 corresponds to a distance of the paw portions. The guiding portion is a roller.

To further improve the efficiency during the separation and recycling, in an embodiment, the waste tire separation recycling treatment device of the invention further has a conveying screen module disposed to a side of the machine rack and located at a side of the guiding portion to receive the non-metal scrap, the mixture and the metal scrap falling from the guiding portion at a set angle, wherein the metal scrap having a great volume is separated from the non-metal scrap having the small volume, the mixture and the metal scrap. The conveying screen module includes a plurality of conveying rollers and a first collection box, and the conveying rollers are disposed at equal distances and side by side, and the first collection box is located at a farthest tail of the conveying rollers to collect the metal scrap having the great volume. Moreover, to further improve the separation effect, the invention is disposed with a set of second stripping wheels disposed to a side of the conveying screen module to strip off the mixture having a small volume such that the mixture having the small volume is separated into the non-metal scrap and the metal scrap. In addition, the invention further includes a magnetic separation module disposed to a side of the set of second stripping wheels to receive the non-metal scrap having the small volume and the metal scrap, wherein the non-metal scrap is separated from the metal scrap by utilizing magnetic property, and the metal scrap having the small volume is conveyed to the first collection box. The magnetic separation module includes a magnetic roller, a guide roller, a conveyor belt and a second collection box, and the magnetic roller and the guide roller are correspondingly disposed, and the conveyor belt is fit to the magnetic roller and the guide roller, and a baffle piece is disposed on the conveyor belt to prevent the metal scrap having the small volume from sucking on the magnetic roller from such that the first collection box may not smoothly receive the metal scrap, and the second collection box is disposed to a side of the magnetic roller, and after the non-metal scrap having the small volume and the metal scrap are conveyed to the conveyor belt near the magnetic roller, the metal scrap is attracted by the magnetic roller and carried on the conveyor belt and conveyed to the first collection box, and the non-metal scrap falls into the second collection box.

DETAILED DESCRIPTION OF THE PREFERRED EMBODIMENTS

The present invention will be explained in more detail with reference to the accompanying drawings.

Figure 1:
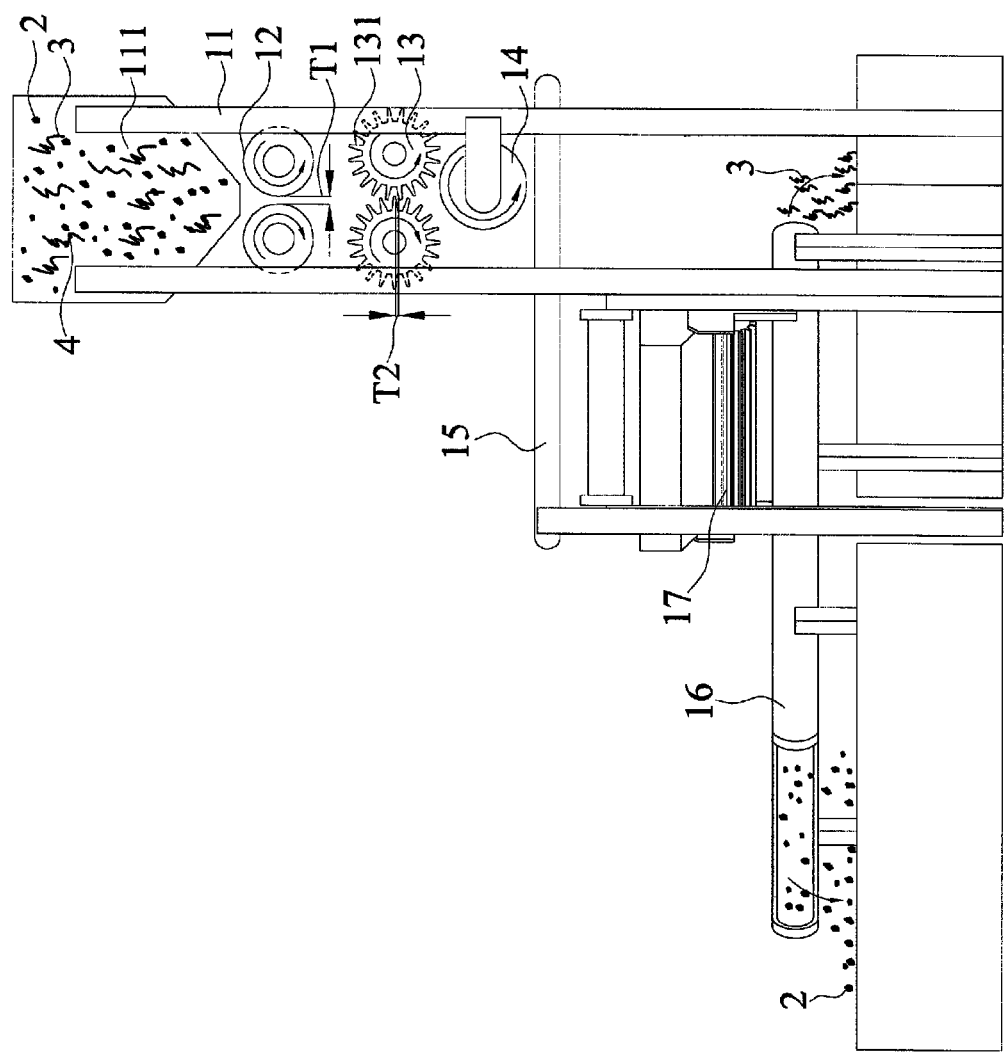
FIG. 1 is a structural schematic diagram according to a preferred embodiment of the present invention.
Figure 2:
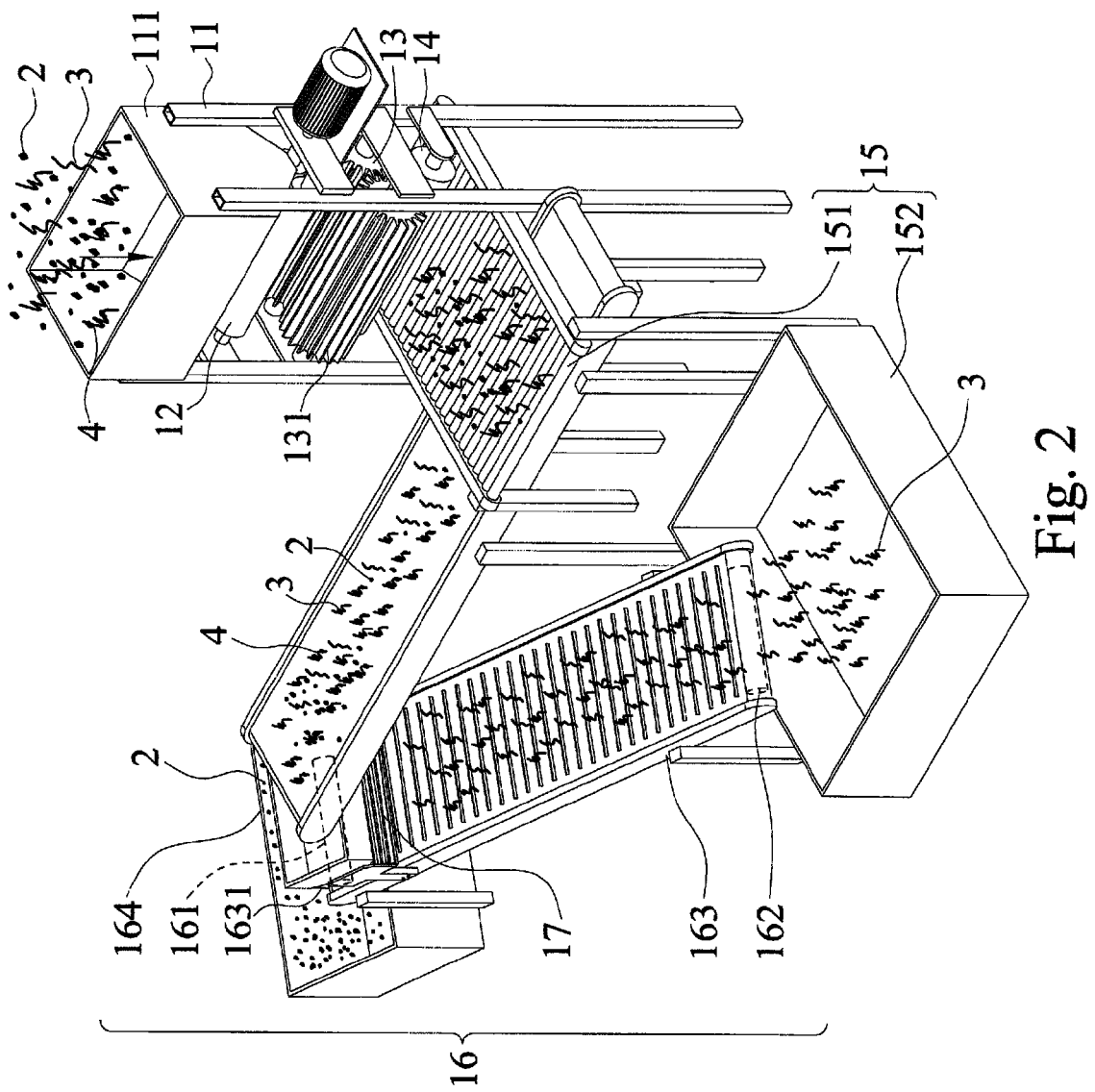
FIG. 2 is a three-dimensional drawing in accordance with a preferred embodiment of the present invention.
Figure 3:
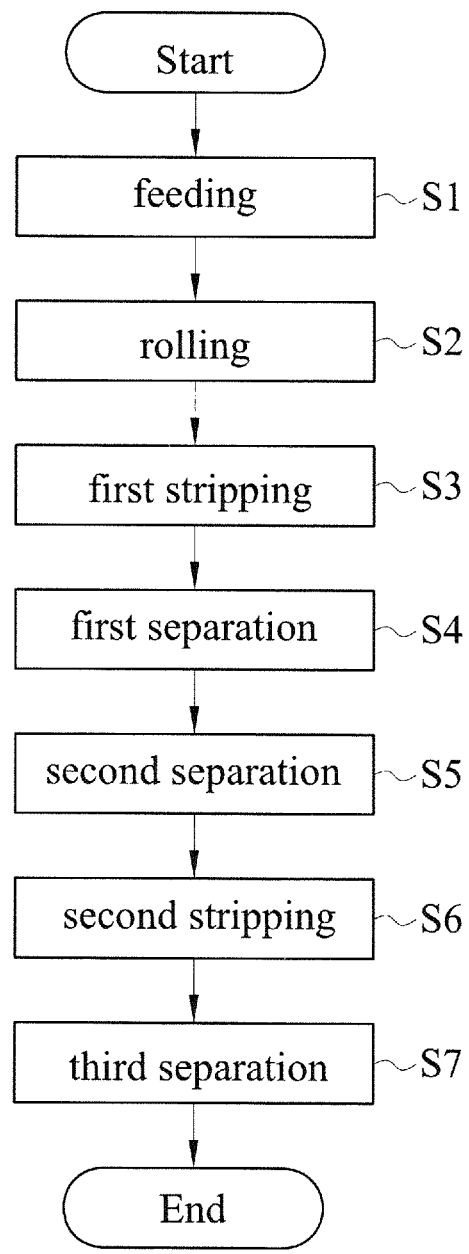
FIG. 3 is a flowchart of corresponding operation in accordance with a preferred embodiment of the present invention.

With reference to FIG. 1, FIG. 2 and FIG. 3 for a structural schematic diagram, a three-dimensional drawing and a flowchart during corresponding operation according to a preferred embodiment of the invention are depicted. As shown in the figures, the waste tire separation recycling treatment device 1 provided by the invention in which the waste tire is composed of a rubber material and a metal material. The waste tire is formed into a non-metal scrap 2, a metal scrap 3 and its mixture 4 after pyrolysis. The mixture 4 is that the non-metal scrap 2 is covered on the surface of the metal scrap 3. The waste tire separation recycling treatment device 1 includes a machine rack 11, a set of crushing rollers 12, a set of first stripping wheels 13 and a guiding portion 14.

The machine rack 11 is a box structure body made of a metal material, and a top of the machine rack 11 is disposed with a feeding port 111. The feeding port 111 is a funnel that is taken as a channel of feeding materials so as to place the non-metal scrap 2, the metal scrap 3 and the mixture 4. The foregoing procedure is so-called feeding to pour the non-metal scrap 2, the metal scrap 3 and the mixture 4 into the machine rack 11.

The set of crushing rollers 12 are symmetrically disposed in the machine rack 11 and below the feeding port 111. A first spacing T1 is disposed between the set of crushing rollers 12. The first spacing T1 is smaller than or equal to sizes of the non-metal scrap 2, the metal scrap 3 and the mixture 4 and provided to roll the non-metal scrap 2, the metal scrap 3 and the mixture 4 such that the non-metal scrap 2, the metal scrap 3 and the non-metal scrap 2 on the surface of the mixture 4 can be crushed. It should be noted that the non-metal scrap and the non-metal scrap 2 on the surface of the mixture are crushed by the rolling of the pair of crushing rollers 12 during the crushing process. The metal scrap 3 can be squelched, lengthened or broken since it has extensibility.

The set of first stripping wheels 13 is also disposed in the machine rack 11 and below the set of crushing rollers 12. The set of first stripping wheels 13 is symmetrically disposed. A second spacing T2 is disposed between the set of first stripping wheels 13. The second spacing T2 is greater than the first spacing T1. A surface of each stripping wheel 13 is respectively disposed with a plurality of paw portions 131. The paw portions 131 are interlaced to allow the second spacing T2 corresponding to the distance of the paw portions 131 such that the set of first stripping wheels 13 are utilized to strip off the metal scrap 3 on the surface of the mixture 4 having greater volumes and the non-metal scrap 2 to separate into the metal scrap 3 and the non-metal scrap 2 from the mixture 4 having the greater volume. It should be noted that the procedure is the first stripping off that utilizes the paw portions 131 of the set of first stripping wheels 13 to strip off a portion of the non-metal scrap 2 on the surface of the mixture 4 having the greater volume through rolling.

The guiding portion 14 is a roller disposed in the machine rack 11 and that is below the set of first stripping wheels 13. The guiding portion 14 is eccentrically disposed at a side of the conveying path to guide the non-metal scrap 2, the mixture 4 having smaller volume and the metal scrap 3, and the non-metal scrap 2 having the smaller volume, the mixture 4 and the metal scrap 3 are performed with a first separation.

Moreover, the waste tire separation recycling treatment device 1 further has a conveying screen module 15 disposed at a side of an outside of the machine rack 11 and at a side of the guiding portion 14 to receive the non-metal scrap 2, the mixture 4 and the metal scrap 3 falling from the guiding portion 14 at a set angle, and the metal scrap 3 having the greater volume and the non-metal scrap 2 having the small volume, the mixture and the metal scrap 3 are performed with a second separation. Moreover, the conveying screen module 15 includes a plurality of conveying rollers 151 and a first collection box 152. The conveying rollers 151 are disposed at equal distances and side by side. Therefore, the metal scrap 3 having the greater volume will be remained on the conveying rollers 151 to move. The non-metal scrap 2 having the smaller volume and the metal scrap fall from the spacing between the conveying rollers 141. The first collection box 152 is located at the farthest tail of the conveying rollers 151 to collect the metal scrap 3 having the greater volume.

A side of the conveying screen module 15 is disposed with a set of second stripping wheels 17 for a second stripping off the mixture 4 having the small volume such that the mixture 4 having the small volume is separated into the non-metal scrap 2 having the small volume and the metal scrap 3.

Finally, a magnetic separation module 16 is disposed below the set of second stripping wheels 17 to receive the non-metal scrap 2 having the small volume and the metal scrap 3. The non-metal scrap 2 is separated from the metal scrap 3 by utilizing the magnetic property, and the metal scrap 3 having the small volume is conveyed in the first collection box 152, wherein the magnetic separation module 16 includes a magnetic roller 161, a guide roller 162, a conveyor belt 163 and a second collection box 164. The magnetic roller 161 and the guide roller 162 are correspondingly disposed. The conveyor belt 163 is fit on the magnetic roller 161 and the guide roller 162. A baffle piece 1631 is disposed on the conveyor belt 163 to prevent the metal scrap 3 having the small volume from being attracted to the magnetic roller 161 such that the first collection box 152 may not smoothly collect the metal scrap 3. The second collection box 164 is located at a side of the magnetic roller 161. After the non-metal scrap 2 having the small volume and the metal scrap 3 are conveyed to the conveyor belt 163 near the magnetic roller 161, the metal scrap 3 is attracted by the magnetic roller 161 and carried on the conveyor belt 163 and conveyed to the first collection box 151. The non-metal scrap 2 falls into the second collection box 164 to achieve an efficacy of a third separation.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A waste tire separation recycling treatment device, wherein a waste tire is composed of a rubber material and a metal material and formed into a non-metal scrap, a metal scrap and a mixture after pyrolysis, and the mixture is that the non-metal scrap is covered on a surface of the metal scrap, the waste tire separation recycling treatment device comprising:

a machine rack disposed with a feeding port for placing the non-metal scrap, the metal scrap and the mixture;

a set of crushing rollers disposed in the machine rack and located at a side of the feeding port, a first spacing T1 disposed between the set of crushing rollers, the first spacing T1 being smaller than or equal to sizes of the non-metal scrap, the metal scrap and the mixture to roll the non-metal scrap, the metal scrap and the mixture such that the non-metal scrap, the metal scrap and the non-metal scrap on a surface of the mixture are crushed;

a set of first stripping wheels disposed in the machine rack and located at a side of the set of crushing rollers, a second spacing T2 dispose between the set of stripping wheels, the second spacing T2 being greater than the first spacing T1, the set of first stripping wheels stripping off the metal scrap on the surface of the mixture having a great volume and the non-metal scrap to separate the mixture into the metal scrap and the non-metal scrap; and a guiding portion disposed in the machine rack and located at a side of the set of first stripping wheels to guide the non-metal scrap, the mixture having a small volume and the metal scrap and to separate the non-metal scrap having the small volume and the mixture from the metal scrap.

2. The waste tire separation recycling treatment device of claim 1, wherein the set of crushing rollers is symmetrically disposed.

3. The waste tire separation recycling treatment device of claim 1, wherein the set of first stripping wheels is symmetrically disposed and a surface of each first stripping wheel is respectively disposed with a plurality of paw portions, and the paw portions are interlaced, and the second spacing T2 corresponds to a distance of the paw portions.

4. The waste tire separation recycling treatment device of claim 1, wherein the guiding portion is a roller.

5. The waste tire separation recycling treatment device of claim 1, further comprising a conveying screen module disposed to a side of the machine rack and located at a side of the guiding portion to receive the non-metal scrap, the mixture having the small volume and the metal scrap falling from the guiding portion at a set angle, wherein the metal scrap having a great volume and the non-metal scrap having the small volume, the mixture are separated from the metal scrap.

6. The waste tire separation recycling treatment device of claim 5, wherein the conveying screen module comprises a plurality of conveying rollers and a first collection box, and the conveying rollers are disposed at equal distances and side by side, and the first collection box is located at a farthest tail of the conveying rollers to collect the metal scrap having the great volume.

7. The waste tire separation recycling treatment device of claim 6, further comprising a set of second stripping wheels disposed to a side of the conveying screen module to strip off the mixture having a small volume such that the mixture having the small volume is separated into the non-metal scrap and the metal scrap.

8. The waste tire separation recycling treatment device of claim 7, further comprising a magnetic separation module disposed to a side of the set of second stripping wheels to receive the non-metal scrap having the small volume and the metal scrap, wherein the non-metal scrap is separated from the metal scrap by utilizing magnetic property, and the metal scrap having the small volume is conveyed to the first collection box.

9. The waste tire separation recycling treatment device of claim 8, wherein the magnetic separation module comprises a magnetic roller, a guide roller, a conveyor belt and a second collection box, and the magnetic roller and the guide roller are correspondingly disposed, and the conveyor belt is fit to the magnetic roller and the guide roller, and a baffle piece is disposed on the conveyor belt, and the second collection box is disposed to a side of the magnetic roller, and after the non-metal scrap having the small volume and the metal scrap are conveyed to the conveyor belt near the magnetic roller, the metal scrap is attracted by the magnetic roller and carried on the conveyor belt and conveyed to the first collection box, and the non-metal scrap falls into the second collection box.

\* \* \* \* \*